(12) United States Patent
Chen et al.

(10) Patent No.: US 9,288,697 B2
(45) Date of Patent: Mar. 15, 2016

(54) WIRELESS COMMUNICATION CIRCUIT WITH A WIDEBAND RECEIVED SIGNAL STRENGTH INDICATOR

(71) Applicant: ISSC TECHNOLOGIES CORP., Hsinchu (TW)

(72) Inventors: Peng-Sen Chen, Zhubei (TW); Mei-Show Chen, Hsinchu (TW); Jeng-Hong Chen, Temple City, CA (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 32 days.

(21) Appl. No.: 13/939,443

(22) Filed: Jul. 11, 2013

(65) Prior Publication Data

US 2014/0016489 A1   Jan. 16, 2014

(30) Foreign Application Priority Data

Jul. 12, 2012  (TW) .............. 101125161 A (51) Int. Cl.
    *H04W 24/08*    (2009.01)
    *H04B 1/00*     (2006.01)
    *H04B 1/10*     (2006.01)

(52) U.S. Cl.
    CPC .............. *H04W 24/08* (2013.01); *H04B 1/006* (2013.01); *H04B 1/1027* (2013.01); *Y02B 60/50* (2013.01)

(58) Field of Classification Search
    CPC ...... H04B 1/406; H03M 1/00; H04L 27/2647
    See application file for complete search history.

(56) References Cited

U.S. PATENT DOCUMENTS

| | | | | |
|---|---|---|---|---|
| 5,970,105 | A  * | 10/1999 | Dacus ........................... | 375/344 |
| 7,212,586 | B2 * | 5/2007  | Shi et al. ...................... | 375/316 |
| 7,605,731 | B2 * | 10/2009 | Van Veldhoven .............. | 341/139 |
| 7,668,514 | B2 * | 2/2010  | Ojo et al. ....................... | 455/73  |
| 8,301,208 | B2   | 10/2012 | Katsube et al. ............... | 455/574 |
| 2007/0004357 | A1 | 1/2007 | Ojo et al. .................... | 455/226.2 |
| 2009/0066436 | A1*| 3/2009 | Wang et al. .................. | 332/119 |
| 2010/0048196 | A1 | 2/2010 | Georgantas et al. ....... | 455/422.1 |

FOREIGN PATENT DOCUMENTS

| | | | | |
|---|---|---|---|---|
| CN | 101605122 A | 12/2009 | ............... | H04B 1/16 |
| CN | 101656543 A | 2/2010  | ............... | H04B 1/00 |

OTHER PUBLICATIONS

Chinese Office Action, Application No. 201210299667.7, 7 pages, Jan. 22, 2016.

* cited by examiner

*Primary Examiner* — Andrew Lai
*Assistant Examiner* — Chuong M Nguyen
(74) *Attorney, Agent, or Firm* — Slayden Grubert Beard PLLC (57) ABSTRACT

It is an objective of the present invention to provide a circuit with a wideband received signal strength indicator, used for multiple systems. By using the switches and the analog-to-digital converter and the demodulator, the circuit of the present invention has the advantages of auto gain control, circuit size reduction and power-saving.

7 Claims, 5 Drawing Sheets

WIRELESS COMMUNICATION CIRCUIT WITH A WIDEBAND RECEIVED SIGNAL STRENGTH INDICATOR

BACKGROUND OF THE INVENTION

1. Field of the Invention

The present invention relates to a wireless communication circuit with an indicator, and in particular to a wireless communication circuit with an wideband received signal strength indicator for multi-wireless systems.

2. Background

Since multi-systems operation is popular in the future, like Bluetooth signal and wireless local area network (WLAN) systems. To enlarge the received signal to the maximum threshold swing of the analog-to-digital converter (ADC), traditionally, receive signal strength indicator (RSSI) and auto gain control (AGC) circuit are added into the baseband demodulator of the wireless local area network (WLAN) receiver. The object is adjusting the gain of the low-noise amplifier and the variable gain amplifier (VGA) through estimating the value of the received signal, thus the received signal can be enlarged to the maximum threshold swing of the analog-to-digital converter, and rise the sensitivity of the systems.

Figure 1:
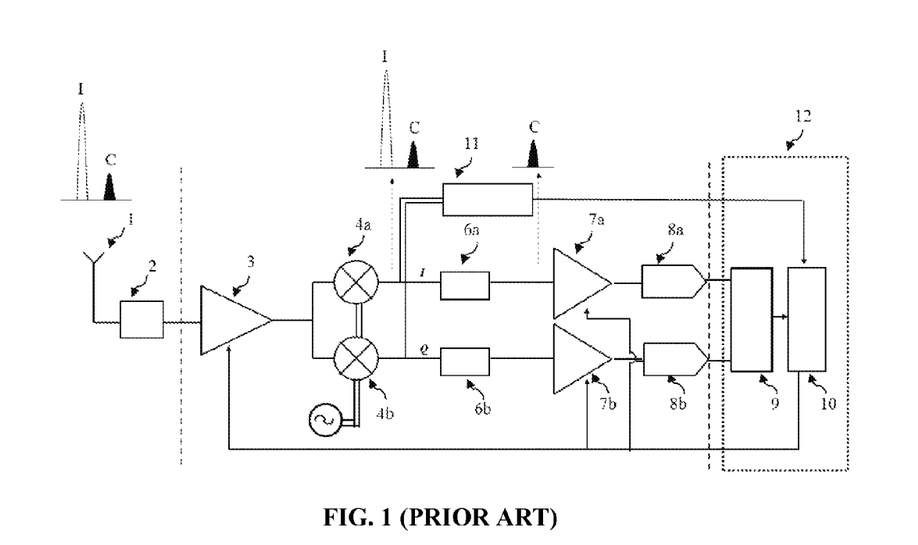
FIG. 1 shows a functional block diagram for the circuit with an indicating detection of wideband received signal strength of the prior art.

However, except the desired wireless local area network (WLAN) signal, the received signals comprising the noise from the adjacent channel interference and multipath fading causes the received signal strength indicator can not detect the strength of the interference effectively. As shown in FIG. 1, if the strength of the noise is too large, the low-noise amplifier 3 and the mixer 4 in the front-end of radio frequency would saturate and reduce the sensitivity of the receiver.

To detect the interference of the signal in the channel for resolving the problem of the circuit saturation in the front-end of radio frequency, in general, wideband receive signal strength indicator (WRSSI or WBRSSI) circuit 11 is used to detect whether the front-end radio frequency will saturate for the baseband auto gain controller, and adjust the gain of low-noise amplifier to avoid saturation. However, the additional circuit with wideband received signal strength indicator increases the circuit size.

U.S. Pat. No. 7,605,731 discloses a signal processor with a signal strength detection circuit that is coupled to a loop of an analog to digital converter. It discloses a loop formed by shunting a filter to an analog-to-digital converter, and a loop signal detector is configured on the signal strength detection circuit. By detecting the signal strength of the filter through the loop signal detector, and generating a gain controlling signal, the delay time of the signal strength detection can be reduced. The patent focuses particularly on the utilization of the filter and the loop signal detector, however, the operation exhibits larger circuit size.

The method of circuits sharing can reduce integration circuit (IC) cost. Besides, large interferences will degrade receive quality, so WBRSSI block is must in the receiver design. According to the disadvantage of the prior art, the inventor proposes a circuit with an indicating detection of wideband received signal strength and auto gain control and method thereof, used for overcoming the above problems.

BRIEF SUMMARY OF THE INVENTION

If first system uses circuits of second ADC and second digital AGC module, and second system use circuits of first ADC and first digital AGC module. If we won't use 2 systems at the same time, then we can use second ADC and second digital AGC module as WBRSSI block, which is controlled by MCU to change switches configurations when operates at second system receive mode. If in multiple systems operation, MCU will know which system is off, then it can use the unused system's switches, ADC and digital AGC module as WBRSSI block.

It is an objective of the present invention to provide a circuit with a wideband received signal strength indicator by switching different switches. The circuit is used for detecting wideband received signal strength indicator through a WBRSSI block using unused system having a analog-to-digital converter module and a demodulator.

To achieve the above objective, the present invention provides a wireless communication circuit with a wideband received signal strength indicator, comprising: a front end signal processing unit; a filter unit; a first analog-to-digital converter module; a first demodulator; a second analog-to-digital converter module; a second demodulator; a first switch; a second switch; a third switch; a forth switch and a controller. The front end signal processing unit is electrically connected to an antenna and used to receive and process a wireless signal from the antenna and then output the low frequency analog signal. The filter unit is electrically connected to the front end signal processing unit and used to receive the low frequency analog signal from the front end signal processing unit and the output a determined band signal. The first analog-to-digital converter module is electrically connected to the filter unit and used to receive and transfer digitally the determined band signal from the filter unit to output a first digital signal. The first demodulator is electrically connected to the first analog-to-digital converter module and the front end signal processing unit and used to receive and demodulate the first digital signal from the first analog-to-digital converter module to output a first control signal. The second analog-to-digital converter module is electrically connected to the front end signal processing unit and the filter unit and used to receive the low frequency analog signal from the front end signal processing unit or the determined band signal from the filter unit, and then transfer digitally the wireless signal from the front end signal processing unit or the determined band signal from the filter unit to output a second digital signal. The second demodulator is electrically connected to the second analog-to-digital converter module, the first demodulator and the front end signal processing unit, and used to receive and demodulate the second digital signal from the second analog-to-digital converter module to output a second control signal. The first switch is electrically connected to the front end signal processing unit and the second analog-to-digital converter module. The second switch is electrically connected to the filter unit and electrically connected to the second analog-to-digital converter module. The third switch is electrically connected to the second demodulator and electrically connected to the front end signal processing unit. The forth switch is electrically connected to the first demodulator and electrically connected to the front end signal processing unit. The controller is electrically connected to the first switch, the second switch, the third switch and the forth switch and is used to control the switching configuration of the first switch, the second switch, the third switch and the forth switch to determine a circuit operation of the wireless communication circuit.

To sum up the above descriptions, the present invention exhibits the following advantages:
1. The circuit minimizes the circuit size and reducing cost by sharing the filters of different wireless communication system;

2. The circuit executes a wideband received signal strength indicator by using the unused system having an analog-to-digital converter module and a demodulator, thus minimizing the circuit size and reducing cost.

3. The circuit can be easily extended to a multiple system which have n analog-to-digital converter module and n demodulator.

These and many other advantages and features of the present invention will be readily apparent to those skilled in the art from the following drawings and detailed descriptions.

BRIEF DESCRIPTION OF THE DRAWINGS

All the objects, advantages, and novel features of the invention will become more apparent from the following detailed descriptions when taken in conjunction with the accompanying drawings.

FIG. 5 further shows the circuit configuration of (a) the first analog-to-digital converter module and (b) the second analog-to-digital converter module in the FIG. 2 according to the present invention;

FIG. 6 further shows circuit configuration of (a) the first demodulator and (b) the second demodulator in the FIG. 2 according to the present invention.

DETAILED DESCRIPTION OF THE INVENTION

Figure 2:
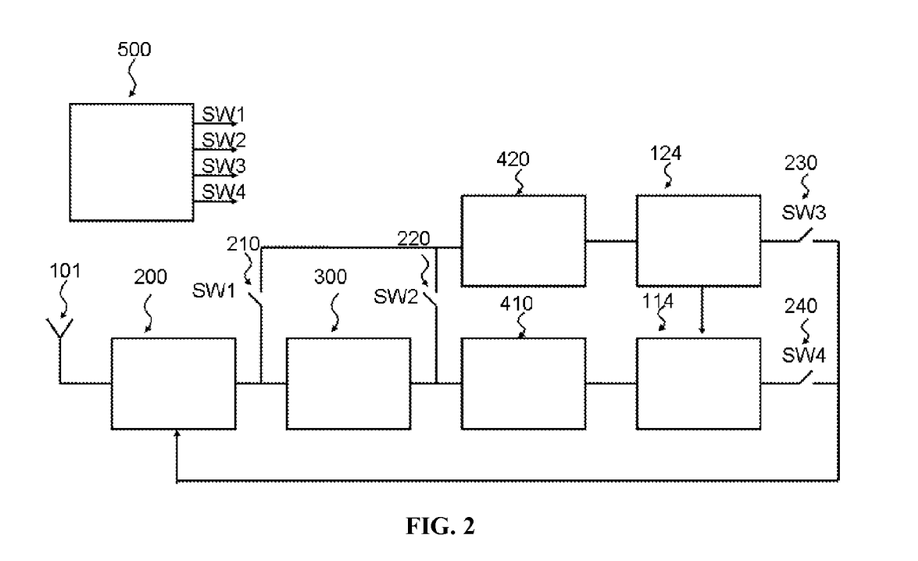
FIG. 2 shows a basic functional block diagram of two systems.

FIG. 2 shows a basic functional block diagram of multiple systems. The present invention comprises a front end signal processing unit 200; a filter unit 300; a first analog-to-digital converter module 410; a first demodulator 114; a second analog-to-digital converter module 420; a second demodulator 124; a first switch 210; a second switch 220; a third switch 230 and a forth switch 240; a controller 500.

The front end signal processing unit 200, electrically connected to an antenna 101, is used to amplify and down-convert a wireless signal from the antenna 101 and then output a low frequency analog signal. It is noted that the antenna 101 is used to receive a wireless signal. The filter unit 300, electrically connected to the front end signal processing unit 200, is used to receive the low frequency analog signal from the front end signal processing unit 200 to output a determined band signal.

The first analog-to-digital converter module 410, electrically connected to the filter unit 300, is used to receive the determined band signal from the filter unit 300 and transfer digitally the determined band signal from the filter unit 300 to output a first digital signal.

The first demodulator 114, electrically connected to the first analog-to-digital converter module 410, is used to receive the first digital signal from the first analog-to-digital converter module 410 and demodulate the first digital signal from the first analog-to-digital converter module 410 to output a first control signal.

The second analog-to-digital converter module 420, electrically connected to the front end signal processing unit 200 and the filter unit 300, is used to receive the low frequency analog signal from the front end signal processing unit 200 or the determined band signal from the filter unit 300, and transfer digitally the low frequency analog from the front end signal processing unit 200 or the determined band signal from the filter unit 300 to output a second digital signal.

The second demodulator 124, electrically connected to the second analog-to-digital converter module 420, the first demodulator 114 and the front end signal processing unit 200, is used to receive the second digital signal from the second analog-to-digital converter module 410 and demodulate the second digital signal from the second analog-to-digital converter module 410 to output a second control signal.

The first switch 210 is electrically connected to the front end signal processing unit 200 and electrically connected to the second analog-to-digital converter module 420. The second switch 220 is electrically connected to the filter unit 300 and electrically connected to the second analog-to-digital converter module 420. The third switch 230 is electrically connected to the second demodulator 124 and electrically connected to the front end signal processing unit 200. The forth switch 240 is electrically connected to the first demodulator 114 and electrically connected to the front end signal processing unit 200.

The controller 500, electrically connected to the first switch 210, the second switch 220, the third switch 230 and the forth switch 240, is used to control the switching configuration of the first switch 210, the second switch 220, the third switch 230 and the forth switch 240 to determine the circuit operation of the wireless communication circuit.

In this invention the wireless communication system can be, but not limited, as Bluetooth signal and wireless local area network (WLAN). Other wireless communication systems, such as Frequency Modulation (FM), Wireless Medical Telemetry Service (WMTS), Globe position system (GPS), and Worldwide Interoperability for Microwave Access (WiMAX), can also use the disclosed circuit of the present invention. It is also noted the wireless communication circuit with a wideband received signal strength indicator according to the present invention is implemented in the same chip.

Figure 3:
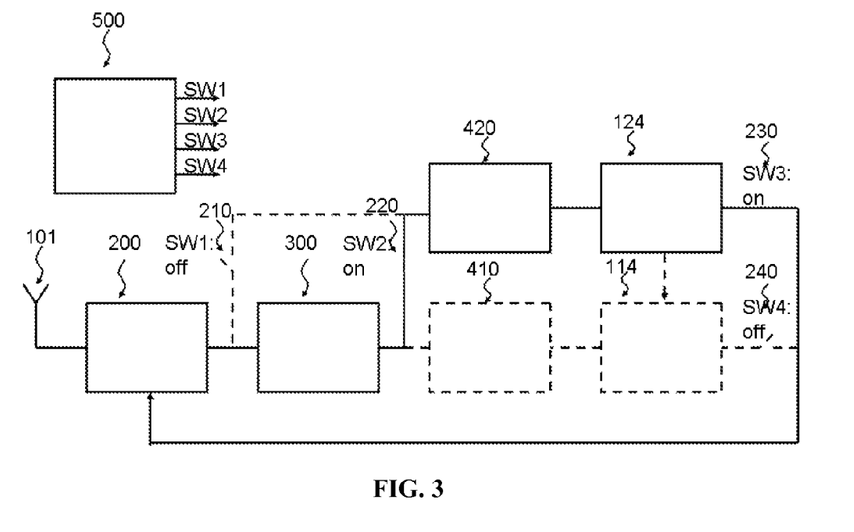
FIG. 3 shows the circuit configuration of first system operation.

FIG. 3 shows circuit configuration of the first system operation. When the first switch 210 and the forth switch 240 are in off state, and the second switch 220 and the third switch 230 are in on state, controlled by the controller 500, the wireless communication circuit of the present invention receive a wireless signal for a wireless communication system. The front end signal processing unit 200 is used to amplify and down-convert the wireless signal from the antenna 101 and then output a low frequency analog signal. The filter unit 300 is used to receive the low frequency analog signal from the front end signal processing unit 200 to output a determined band signal. The second analog-to-digital converter module 420 is used to receive the determined band signal from the filter unit 300 through the second switch 220, and transfer digitally the determined band signal from the filter unit 300 to output a second digital signal. The second demodulator 124 is used to receive the second digital signal from the second analog-to-digital converter module 420 and demodulate the second digital signal from the second analog-to-digital converter module 420 to output a second control signal to the front end signal processing unit 200 through the third switch 230.

In another embodiment, when the first switch 210, the second switch 220 and the third switch 230 are in off state, and the forth switch 240 are in on state, all controlled by the controller 500, the wireless communication circuit of the present invention, operated in another system, also receive a wireless signal for a wireless communication system. The front end signal processing unit 200 is used to amplify and down-convert the wireless signal from the antenna 101 and then output a low frequency analog signal. The filter unit 300 is used to receive the low frequency analog signal from the front end signal processing unit 200 to output a determined band signal. The first analog-to-digital converter module 410 is used to receive the low frequency analog signal from the front end signal processing unit 200 and transfer digitally the low frequency analog from the front end signal processing unit 200 to output a first digital signal. The first demodulator 114 is used to receive the first digital signal from the first analog-to-digital converter module 410 and demodulate the second digital signal from the second analog-to-digital converter module 410 to output a first control signal to the front end signal processing unit 200 through the forth switch 240.

Figure 4:
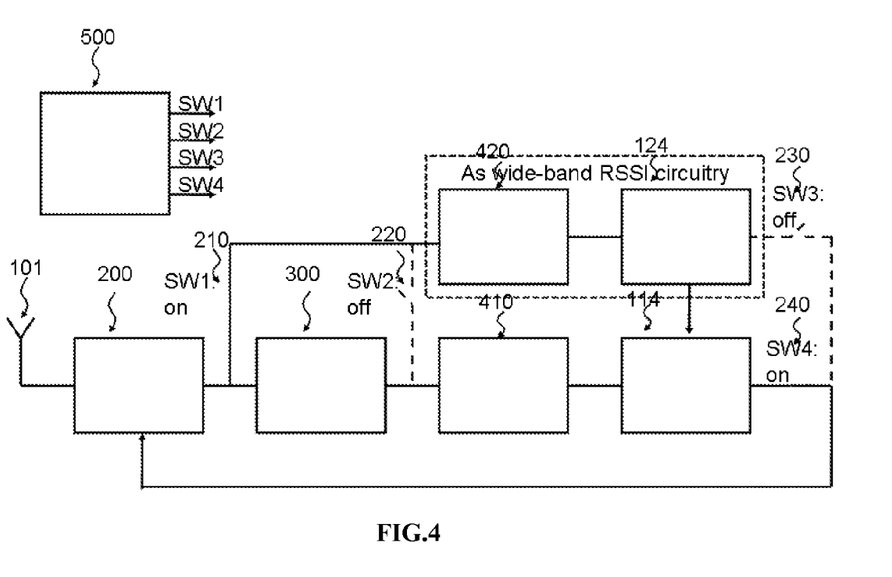
FIG. 4 shows circuit configuration of second system operation with WBRSSI function which is provided by the circuits of the first system.

FIG. 4 shows circuit configuration of second system operation. This system operation uses the second analog-to-digital converter 420 and the second demodulator 124 to be the WBRSSI block to obtain the wideband received signal strength indicator (WBRSSI). In this operation, the first switch 210 and the forth switch 240 are in on state, and the second switch 220 and the third switch 230 are in off state, all controlled by the controller 500. The main goal is that the second demodulator 124 would output the second control signal, which is to be a reference of the wideband received signal strength indicator (WBRSSI). The front end signal processing unit 200 is used to amplify and down-convert the wireless signal from the antenna 101 and then output a low frequency analog signal. The filter unit 300 is used to receive the low frequency analog signal from the front end signal processing unit 200 to output a determined band signal. The first analog-to-digital converter module 410 is used to receive the low frequency analog signal from the front end signal processing unit 200 and transfer digitally the low frequency analog from the front end signal processing unit 200 to output a first digital signal. The first demodulator 114 is used to receive the first digital signal from the first analog-to-digital converter module 410 and demodulate the second digital signal from the second analog-to-digital converter module 410 to output a first control signal to the front end signal processing unit 200 through the forth switch 240.

At the time, the second analog-to-digital converter module 420 is used to receive the low frequency analog signal from the front end signal processing unit 200 through the first switch 210 and transfer digitally the determined band signal from the filter unit 300 to output a second digital signal. The second demodulator 124 is used to receive the second digital signal from the second analog-to-digital converter module 410 and demodulate the second digital signal from the second analog-to-digital converter module 410 to output a second control signal to be the be a reference of the wideband received signal strength indicator (WBRSSI) to the first demodulator 114.

Figure 5A:
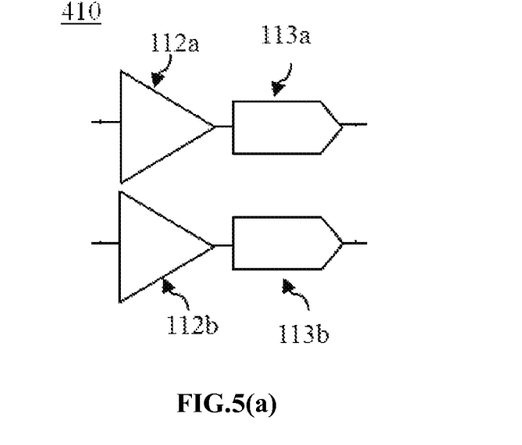
Figure 5B:
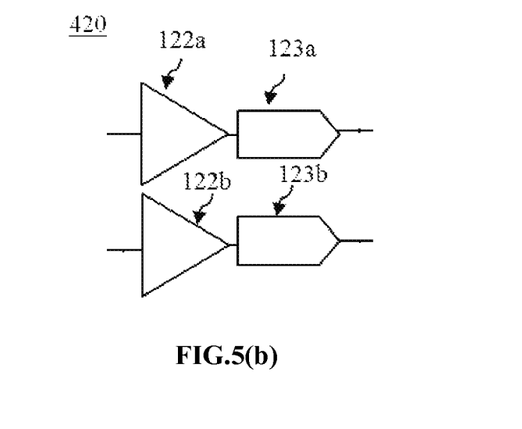

Please refer to FIG. 5, it further shows the circuit configuration of (a) the first analog-to-digital converter module 410 and (b) the second analog-to-digital converter module 420 in the FIG. 2 according to the present invention.

The first analog-to-digital converter module 410 shown in FIG. 2 comprises the first driver 112*a*; the second driver 112*b*; the first analog-to-digital converter 113*a* and the second analog-to-digital converter 113*b*. The first driver 112*a* has an input port and an output port, and the input port is electrically connected to an output port of the filter unit 300. The second driver 112*b* has an input port and an output port, and the input port is electrically connected to the output port of the filter unit 300. The first analog-to-digital converter 113*a* has an input port and an output port, and the input port is electrically connected to the output port of the first driver 112*a*. The second analog-to-digital converter 113*b* has an input port and an output port, and the input port is electrically connected to the output port of the second driver 112*b*.

The second analog-to-digital converter module 420 shown in FIG. 2 comprises the third driver 122*a*; the fourth driver 122*b*; the third analog-to-digital converter 123*a* and the fourth analog-to-digital converter 123*b*. The third driver 122*a* has an input port and an output port, and the input port is electrically connected to an output port of the front end signal processing unit 200 through the first switch 210 and the output port of the filter unit 300 through the second switch 220. The fourth driver 122*b* has an input port and an output port, and the input port is also electrically connected to an output port of the front end signal processing unit 200 through the first switch 210 and the output port of the filter unit 300 through the second switch 220. The third analog-to-digital converter 123*a* has an input port and an output port, and the input port is electrically connected to the output port of the third driver 122*a*. The fourth analog-to-digital converter 123*b* has an input port and an output port, and the input port is electrically connected to the output port of the fourth driver 122*b*.

Figure 6A:
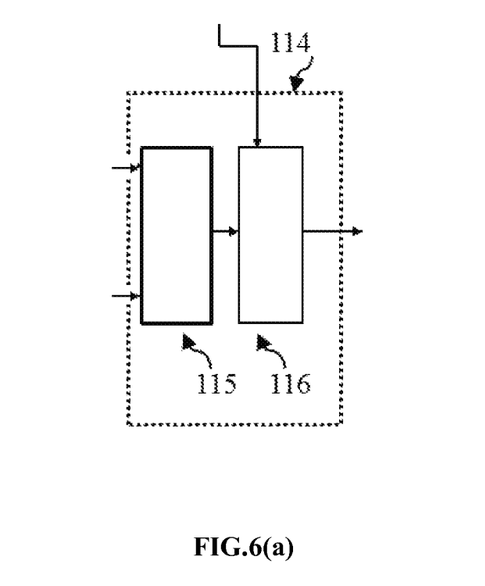
Figure 6B:
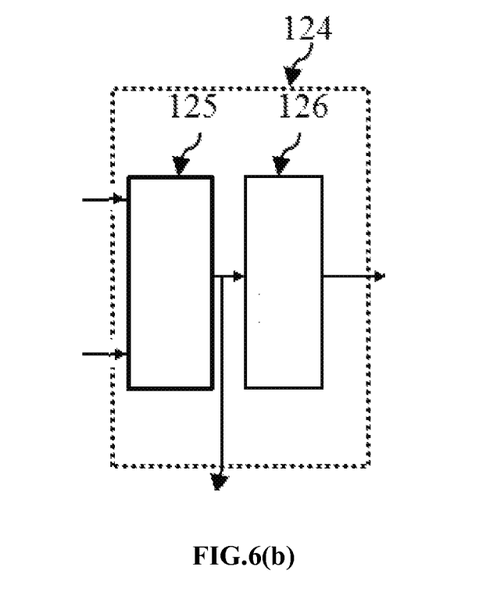

Please refer to FIG. 6, it further shows circuit configuration of (a) the first demodulator 114 and (b) the second demodulator 124 in the FIG. 2 according to the present invention. The first demodulator 114 comprises a first received signal strength indicator 115 and a first auto gain controller 116.

The first received signal strength indicator 115 has a first input port, a second input port and an output port, and the first input port is electrically connected to the output port of the first analog-to-digital converter 113*a*, and the second input port is electrically connected to the output port of the second analog-to-digital converter 113*b*. The first auto gain controller 116 has a first input port, a second input port and an output port, and the first input port is electrically connected to the output port of the first received signal strength indicator 115, and the output port is electrically connected to the front end signal processing unit 200 through the forth switch 240.

The second demodulator 124 further comprises: a second received signal strength indicator 125 and a second auto gain controller 126. The second received signal strength indicator 125 has a first input port, a second input port and an output port, and the first input port is electrically connected to the output port of the third analog-to-digital converter 123*a*, the second input port is electrically connected to the output port of the fourth analog-to-digital converter 123*b* and the output port electrically connected to the second input port of the first auto gain controller 116. The second auto gain controller 126 has an input port and an output port, and the input port is electrically connected to the output port of the second received signal strength indicator 125, and the output port is electrically connected to the front end signal processing unit 200 through the third switch 230.

It is clearly observed that an objective of the present invention is to provide a circuit with a wideband received signal strength indicator, especially used for multiple systems. By using the switches controlled the controller 500, one set of the analog-to-digital converter and the demodulator is to proceed WBRSSI function to obtain the wideband received signal strength indicator (WBRSSI). Therefore, the circuit of the present invention has the advantages of auto gain control, circuit size reduction and power-saving.

Figure 7:
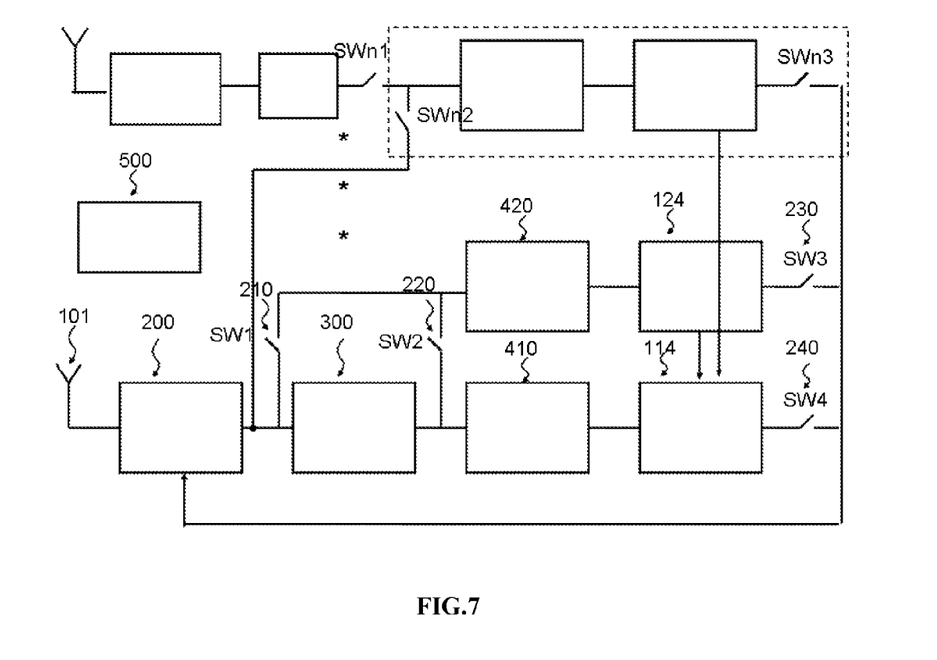
FIG. 7 shows a basic functional block diagram of multiple systems.

Although the invention has been explained in relation to its preferred embodiment, it is not used to limit the invention. It is to be understood that many other possible modifications and variations can be made by those skilled in the art without departing from the spirit and scope of the invention as hereinafter claimed. For example, although the above description use only two pairs of the analog-to-digital converter module and the demodulator to explain the system operation, however, it shall be noted that the circuit of the present invention can be extended to the multiple systems, which is shown as FIG. 7. The controller 500 always knows the status of every system. If first system is in use and if someone system "n" is unused, then controller 500 can control nth system's switches, the nth analog-to-digital converter module and the nth demodulator to proceed WBRSSI function. For example, there are four systems such as WLAN/Bluetooth/FM/GPS embedded in the same chip. If WLAN system is in use as receiver, and in this time, GPS system is in off mode, then controller 500 can control to enable GPS's switches, the analog-to-digital converter module and the demodulator of the GPS system to execute WBRSSI function. Namely, the wireless communication circuit further comprises a plurality of analog-to-digital converters and a plurality of demodulators. And one of the analog-to-digital converters and the corresponding demodulator are used as the WBRSSI block to obtain the wideband received signal strength indicator.

What is claimed is:

1. A wireless communication circuit with a wideband received signal strength indicator, comprising:
   a front end signal processing unit, electrically connected to an antenna, configured to receive and process a wireless signal from the antenna and to output a low frequency analog signal;
   a filter unit, electrically connected to the front end signal processing unit, and configured to receive the low frequency analog signal from the front end signal processing unit and to output a determined band signal;
   a first analog-to-digital converter module, electrically connected to the filter unit, and configured to receive and transform the determined band signal from the filter unit into a first digital signal;
   a first demodulator, electrically connected to the first analog-to-digital converter module and the front end signal processing unit, and configured to receive and demodulate the first digital signal from the first analog-to-digital converter module and to output a first control signal;
   a second analog-to-digital converter module, selectively electrically connected to the front end signal processing unit or the filter unit, and configured to receive the low frequency analog signal from the front end signal processing unit or the determined band signal from the filter unit, and to transform the low frequency analog signal from the front end signal processing unit or the determined band signal from the filter unit into a second digital signal;
   a second demodulator, electrically connected to the second analog-to-digital converter module, the first demodulator and the front end signal processing unit, and configured to receive and demodulate the second digital signal from the second analog-to-digital converter module and to output a second control signal;
   a first switch, electrically connected between the front end signal processing unit and the second analog-to-digital converter module;
   a second switch, electrically connected between the filter unit and the second analog-to-digital converter module;
   a third switch, electrically connected between the second demodulator and the front end signal processing unit;
   a fourth switch, electrically connected between the first demodulator and the front end signal processing unit; and
   a controller, electrically connected to the first switch, the second switch, the third switch and the fourth switch, and configured to control a switching configuration of the first switch, the second switch, the third switch and the fourth switch to determine a circuit operation of the wireless communication circuit.

2. A wireless communication circuit with a wideband received signal strength indicator according to claim 1, wherein the circuit is implemented within a single chip.

3. A wireless communication circuit with a wideband received signal strength indicator according to claim 1, wherein the wireless communication circuit uses the second analog-to-digital converter and the second demodulator to be a wideband received signal strength indicator (WBRSSI) block to obtain the wideband received signal strength indicator (WBRSSI) when the first switch and the fourth switch are in an on state, and the second switch and the third switch are in an off state.

4. A wireless communication circuit with a wideband received signal strength indicator according to claim 1, wherein the first analog-to-digital converter module comprises:
   a first driver, having an input port and an output port, the input port electrically connected to an output port of the filter unit;
   a second driver, having an input port and an output port, the input port electrically connected to the output port of the filter unit;
   a first analog-to-digital converter, having an input port and an output port, the input port electrically connected to the output port of the first driver; and
   a second analog-to-digital converter, having an input port and an output port, the input port electrically connected to the output port of the second driver.

5. A wireless communication circuit with a wideband received signal strength indicator according to claim 1, wherein the second analog-to-digital converter module comprises:
   a third driver, having an input port and an output port, the input port electrically connected to an output port of the front end signal processing unit through the first switch and the output port of the filter unit through the second switch;
   a fourth driver, having an input port and an output port, the input port electrically connected to the output port of the front end signal processing unit through the first switch and the output port of the filter unit through the second switch;
   a third analog-to-digital converter, having an input port and an output port, the input port electrically connected to the output port of the third driver; and
   a fourth analog-to-digital converter, having an input port and an output port, the input port electrically connected to the output port of the fourth driver.

6. A wireless communication circuit with a wideband received signal strength indicator according to claim 1, wherein the first demodulator comprises:
   a first received signal strength indicator, having a first input port, a second input port and an output port, the first input port electrically connected to the output port of the first analog-to-digital converter, and the second input port electrically connected to the output port of the second analog-to-digital converter; and a first auto gain controller, having a first input port, a second input port and an output port, the first input port electrically connected to the output port of the first received signal strength indicator, and the output port electrically connected to the front end signal processing unit through the forth switch.

7. A wireless communication circuit with a wideband received signal strength indicator according to claim 1, wherein the second demodulator comprises:

a second received signal strength indicator, having a first input port, a second input port and an output port, the first input port electrically connected to the output port of the third analog-to-digital converter, and the second input port electrically connected to the output port of the fourth analog-to-digital converter, the output port electrically connected to the second input port of the first auto gain controller; and a second auto gain controller, having an input port and an output port, the input port electrically connected to the output port of the second received signal strength indicator, and the output port electrically connected to the front end signal processing unit through the third switch.

* * * * *